(12) United States Patent
Chen et al.

(10) Patent No.: US 7,142,262 B2
(45) Date of Patent: Nov. 28, 2006

(54) LIQUID CRYSTAL DISPLAY MODULE

(75) Inventors: Hui-Chang Chen, Kaohsiung (TW); Chin-Chen Yang, Jhubei (TW)

(73) Assignee: AU Optronics Corp., Hsinchu (TW)

( * ) Notice: Subject to any disclaimer, the term of this patent is extended or adjusted under 35 U.S.C. 154(b) by 106 days.

(21) Appl. No.: 10/889,385

(22) Filed: Jul. 12, 2004

(65) Prior Publication Data

US 2005/0083444 A1   Apr. 21, 2005

(30) Foreign Application Priority Data

Oct. 16, 2003   (TW) ............................... 92128770 A

(51) Int. Cl.
*G02F 1/1333* (2006.01)
(52) U.S. Cl. ........................................................ 349/40
(58) Field of Classification Search ................. 349/40, 349/55, 192, 54
See application file for complete search history.

(56) References Cited

U.S. PATENT DOCUMENTS 6,919,931 B1 * 7/2005 Chae ........................... 349/40

* cited by examiner

*Primary Examiner*—James A. Dudek
(74) *Attorney, Agent, or Firm*—Thomas, Kayden, Horstemeyer & Risley

(57) ABSTRACT

A liquid crystal display module includes a substrate, one or more first leads, one or more shorting bars, one or more second leads and one or more cutting traces. The first leads and the shorting bars are disposed over the substrate. The shorting bars are adjacent to the first leads and electrically connected to the first leads via one or more connecting lines. The second leads are mounted with the first leads respectively and are electrically connected to the corresponding first leads. The cutting traces are used for electrically disconnecting the first leads from the shorting bars. A laser beam is used to cut off the connecting lines along the cutting trace after the liquid crystal display module has been tested, so that the short bar is electrically disconnected from the first leads, and a disconnecting point is formed on the intersection of the each cutting trace and connecting line.

15 Claims, 8 Drawing Sheets

LIQUID CRYSTAL DISPLAY MODULE

This application claims the benefit of Taiwan application Serial No. 092128770, filed Oct. 16, 2003, the subject matter of which is incorporated herein by reference.

BACKGROUND OF THE INVENTION

1. Field of the Invention

The invention relates in general to a liquid crystal display module, and more particularly, to a liquid crystal display module with short-circuit protection for the test circuit.

2. Description of the Related Art

In order to reduce the failure rate of the polarizer during the manufacturing process of liquid crystal display (LCD), the original function test is re-scheduled forward. The pre-test for the substrate of thin film transistor (TFT) is now re-scheduled and is done prior to the pasting of the polarizer, so that faulty TFT glass substrates can be found earlier and the pass rate during the manufacturing process can be improved.

Referring to FIG. 1, a partial block diagram of the circuit layout according to a conventional test circuit. A number of indium tin oxide (ITO) leads (under ITO layer have others metal) 106a, 106b, 106c and 106d are deposited on one side of TFT glass substrate (not shown in FIG. 1) in equal distance. Test circuit 102 includes a number of metal wires 102a, 102b and 102c. Test circuit 102 is also deposited on the TFT glass substrate. Traces 104a, 104b, 104c and 104d are electrically connected to their corresponding ITO leads 106a, 106b, 106c and 106d. The trace 104 and test circuit 102 are electrically connected together via contact hole 112, while test circuit 102 and its corresponding ITO lead 106 are electrically connected together in a shortest straight line by trace 104.

Prior to the pre-test, the TFT glass substrate is electrically connected to a test unit 114 via test circuit 102 and is tested by test unit 114.

Referring to both FIG. 2 and FIG. 3A at the same time. FIG. 2 is a partial block diagram showing the connection between tape carrier package leads (TCP leads) and indium tin oxide (ITO) leads according to prior arts while FIG. 3A is a sectional view along the sectional line 3A–3A' in FIG. 2. Test circuit 102 is covered up by a first passivation layer 308 for isolating and protecting the test circuit. Traces 104a, 104b, 104c and 104d are covered up by a second passivation layer 110. When the pre-test is completed, a laser beam is used to burn trace 104 and have it separated to form an electrically isolated region which is be further extended to form a laser cutting path 108. After that, TCP lead 202 is sealed to its corresponding ITO lead 106 on glass substrate 302 using heat sealing process.

Referring to FIG. 3A, the manufacturing process for sealing the TCP leads to the glass substrate is elaborated below. First, pasting an anisotropic conductive film (ACF) 306 on ITO lead 106b. Next, TCP lead 202b and ITO lead 106b are mounted together and pressed downward, so that TCP lead 202b is sealed and electrically connected to ITO lead 106b via ACF 306. Meanwhile, TCP and glass substrate 302 are connected together as well.

Referring TO FIG. 3A, TCP whose IC chips are not shown here includes three layers, namely, soft tape layer 310 which uses polyimide (PI) as the base material, copper plating layer 312, and solder resist layer 314, wherein TCP lead 202b is formed on copper plating layer 312 to be electrically connected to ITO lead 106b.

Referring to FIG. 3B, an enlargement of region A in FIG. 3A. In the conventional process disclosed above, the laser cutting process performs an instant high-temperature heat treatment on trace 104. Consequently, trace 104 is melted and cut off to form a laser cutting path 108 whereby metal wire 102b is electrically disconnected from ITO lead 106. However, during the high-temperature melting process, trace 104b might spread over the top-face of second passivation 110 and leave metal remnants 316 thereon. When TCP lead 202b is to be sealed to ITO lead 106b, TCP lead 202b will contact with metal remnants 316 at the breakpoints on trace 104b resulting in short circuits. Under this circumstance, malfunction in TFT substrate will arise and lead to in a high rejection rate.

SUMMARY OF THE INVENTION

It is therefore an object of the invention to provide a liquid crystal display module with short-circuit protection for the test circuit to reduce the rejection rate of the TFT substrate.

It is therefore an object of the invention to provide a liquid crystal display module including a substrate, one or more first leads, one or more shorting bars. one or more second leads and one or more cutting traces. The first leads are disposed over the periphery of the substrate. The shorting bars are disposed over the substrate edge. The shorting bars are adjacent to the end of first leads and electrically connected to the corresponding first leads via one or more connecting lines. The second leads are mounted with the corresponding first leads respectively and are electrically connected to the corresponding first leads. The cutting traces are used for electrically disconnecting the first leads from the shorting bars. The intersection of the each cutting trace and connecting line is located between every two adjacent second leads. A laser beam is used to cut off the connecting lines along the cutting trace after the liquid crystal display module has been tested, so that the short bar is electrically disconnected from the first leads, and a disconnecting point is formed on the intersection of the each cutting trace and connecting line.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
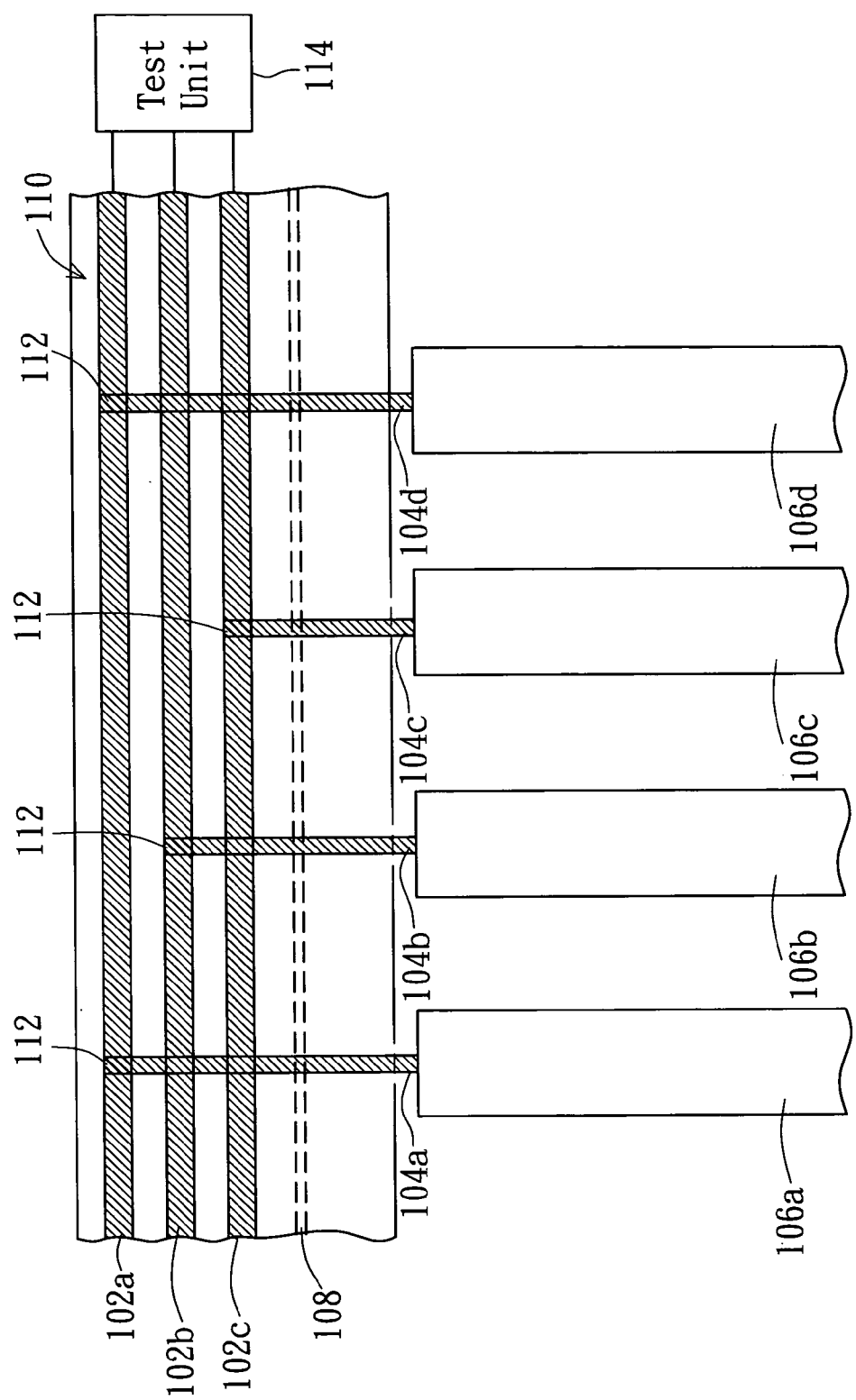
FIG. 1 (Prior Art) shows a partial block diagram of the circuit layout according to a conventional test circuit.
Figure 2:
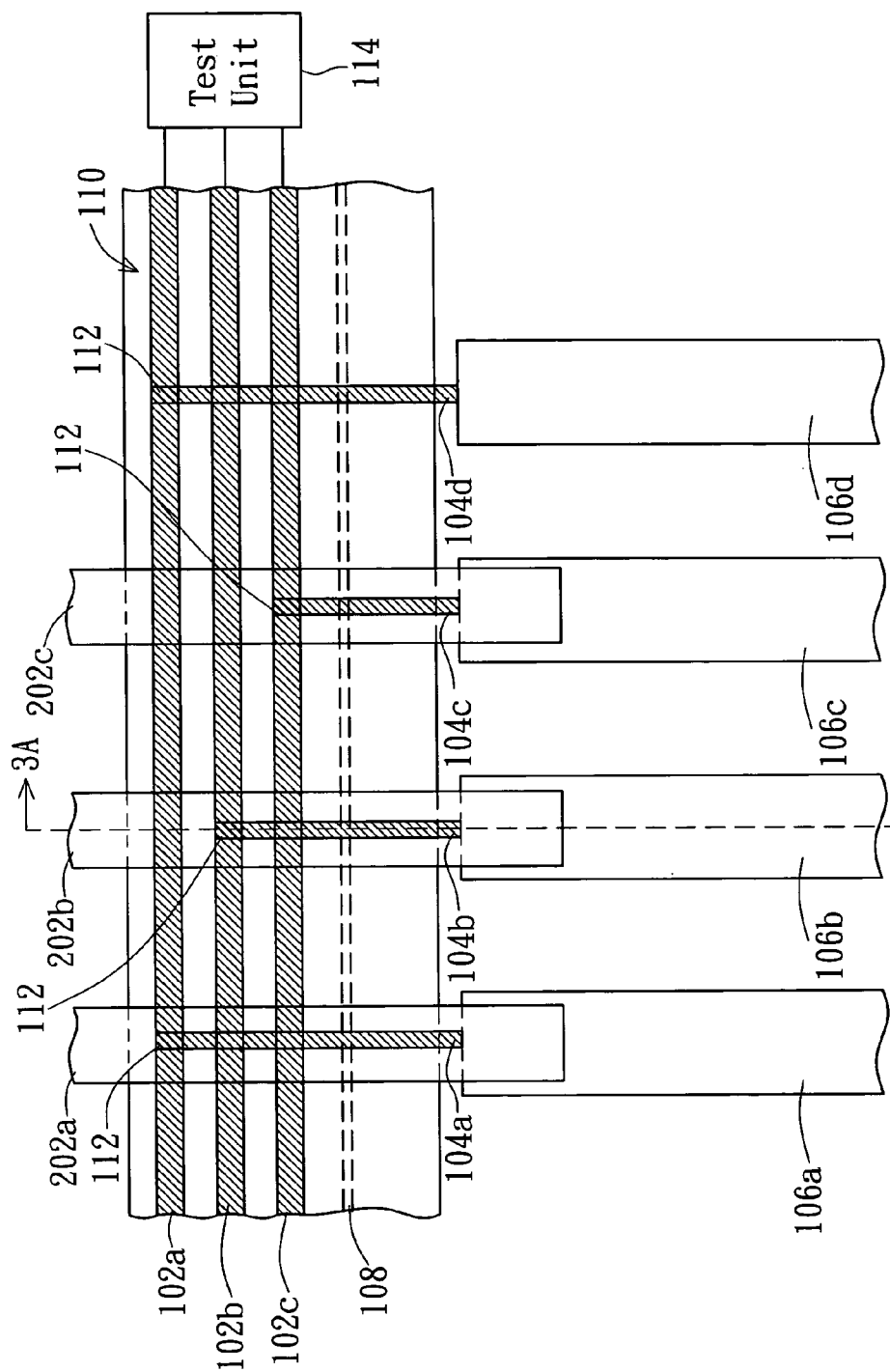
FIG. 2 (Prior Art) is a partial block diagram showing the connection between tape carrier package leads (TCP leads) and indium tin oxide (ITO) leads according to prior arts.
Figure 3A:
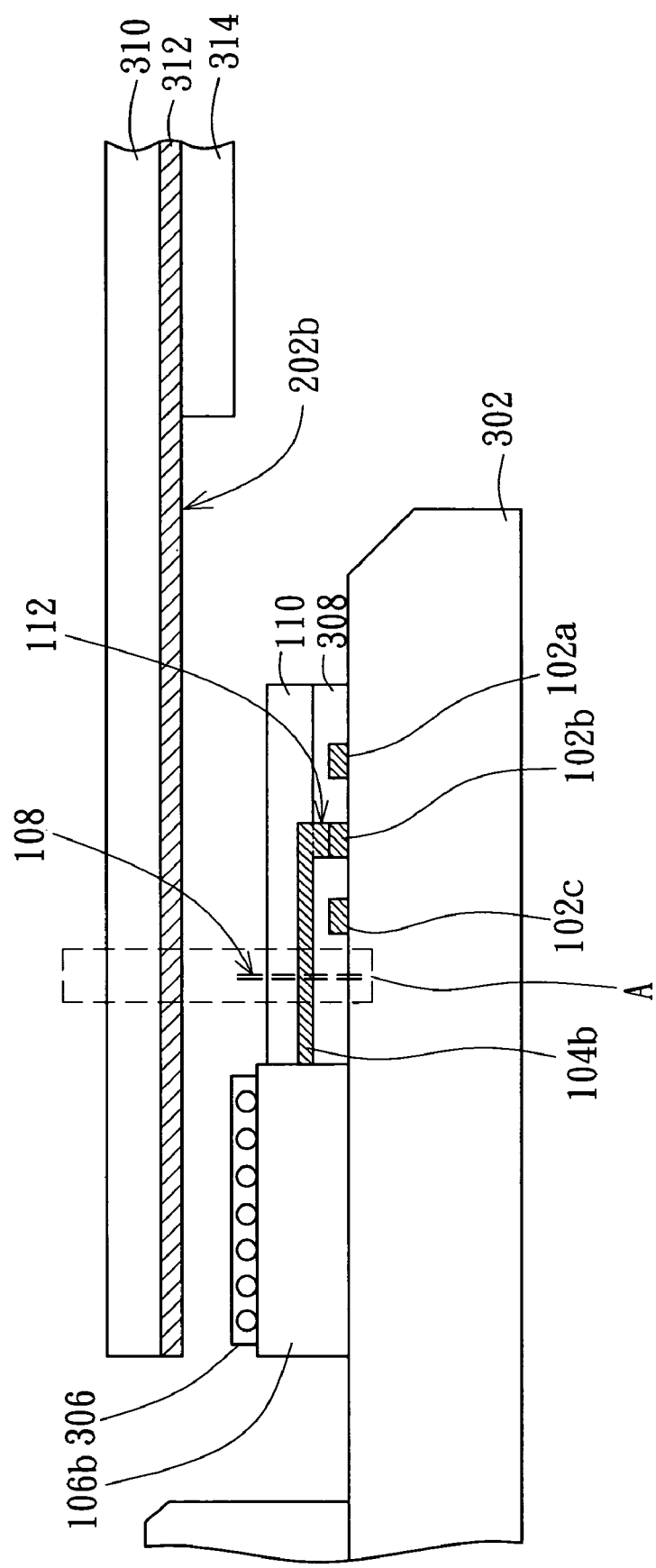
FIG. 3A (Prior Art) is a sectional view along the sectional line 3A–3A' in FIG. 2.
Figure 3B:
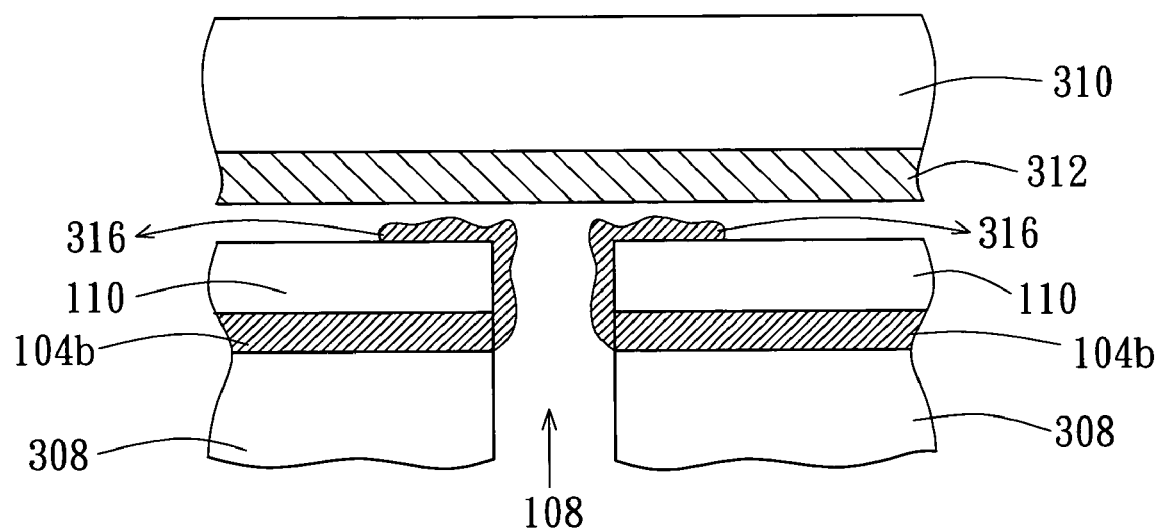
FIG. 3B (Prior Art) is an enlargement of region A in FIG. 3A.
Figure 4:
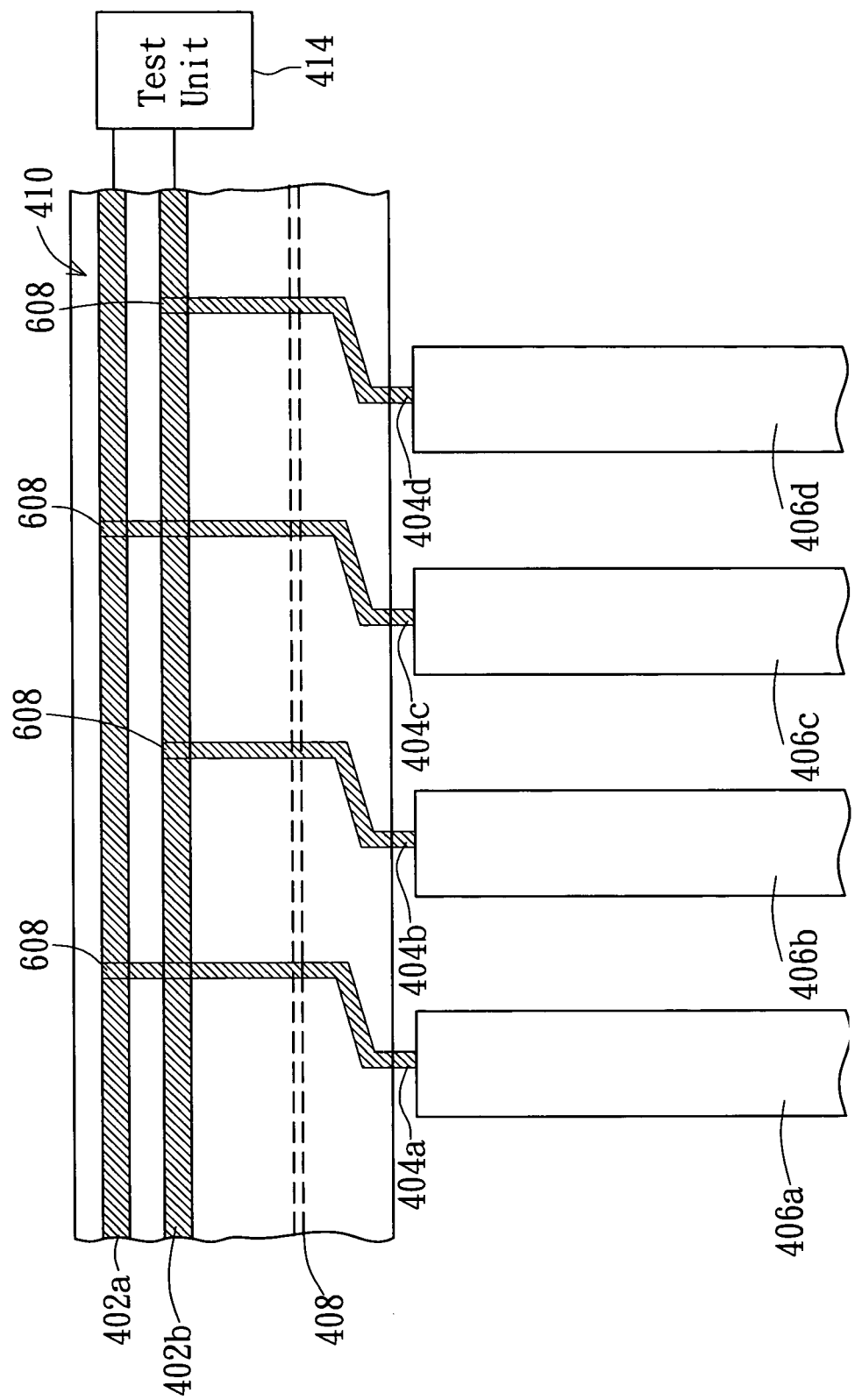
FIG. 4 shows a partial block of the TFT substrate according to a preferred embodiment of the invention.
Figure 5:
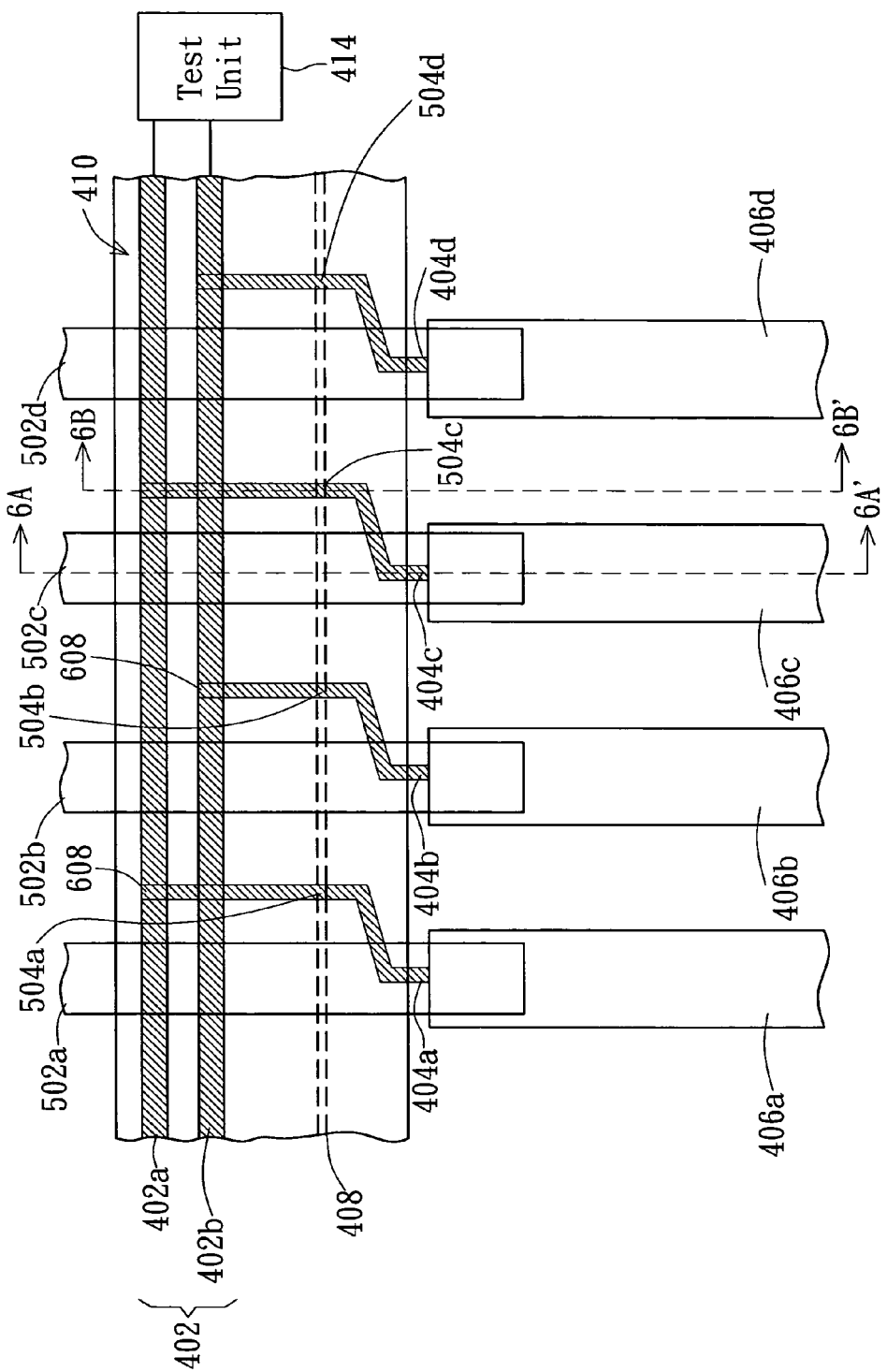
FIG. 5 is a diagram of a partial block of the liquid crystal display module according to the invention showing the status when TCP leads is mounted with ITO leads.

Referring to FIG. 4, a partial block of the TFT substrate according to a preferred embodiment of the invention, and FIG. 5, a diagram of a partial block of the liquid crystal display module according to the invention showing the status when TCP leads and ITO leads are mounted together. A test circuit includes two shorting bars 402a and 402b wherein the two shorting bars which are deposited in parallel and are situated to the external of first leads 406, are electrically connected together via a number of corresponding connecting lines 404. Besides, shorting bars 402a and 402b are electrically connected to an external test unit 414 whereby liquid crystal display module is tested. That is to say, test unit 414 sends out a pre-test signal, which arrives at connecting lines 404a, 404b, 404c and 404d via shorting bars 402a and 402b and is further transmitted to first leads 406a, 406b, 406c and 406d via connecting lines 404. In one embodiment, the first leads comprise a number of indium tin oxide (ITO) leads. In other embodiment, the first leads comprise metal. The shorting bars comprise a number of metal wires, and the connecting lines comprise a number of metal wires.

Connecting lines 404, which are covered up by a second passivation layer 410, can be electrically connected to their corresponding shorting bars 42a and 402b via a number of via holes 608. After the liquid crystal display module has been tested by test unit 414, a laser beam will perform laser cutting along a cutting trace 408; after that, each of second leads 502 is mounted with its corresponding first lead 406 and is sealed thereto. The intersections of cutting trace 408 and connecting lines 404a, 404b, 404c and 404d form corresponding disconnecting points 504a, 504b, 504c and 504d through which shorting bars 402 are electrically disconnected from ITO leads 406. In one embodiment, the second leads comprise a number of tape carrier package (TCP) leads. In other embodiment, the second leads comprise metal.

As shown in FIG. 4, partial segments on connecting line 404 are arranged in L-shaped form, wherein the L-shaped segment has a line segment deposited in a vertical direction. Since the partial segments on connecting line 404 are arranged in a form like an L, each of the disconnecting points 504 formed at the intersections of cutting trace 408 and the line segment of the L-shaped segment will be situated between every two adjacent second leads 502. For example, disconnecting point 504a formed on the intersection of the cutting trace 408 and line segment of connecting line 404a is situated between second leads 502a and 502b. The disconnecting points 504 can be situated to the right of their corresponding second leads 502 as shown in FIG. 5. Nevertheless, disconnecting points 504 can also be situated to the left of their corresponding second leads 502.

According to the above arrangement, metal remnants, though might still spread over second passivation layer 410, will not contact with second leads 502 during the sealing process thereof. Consequently, short circuits will not occur during the sealing process.

Figure 6A:
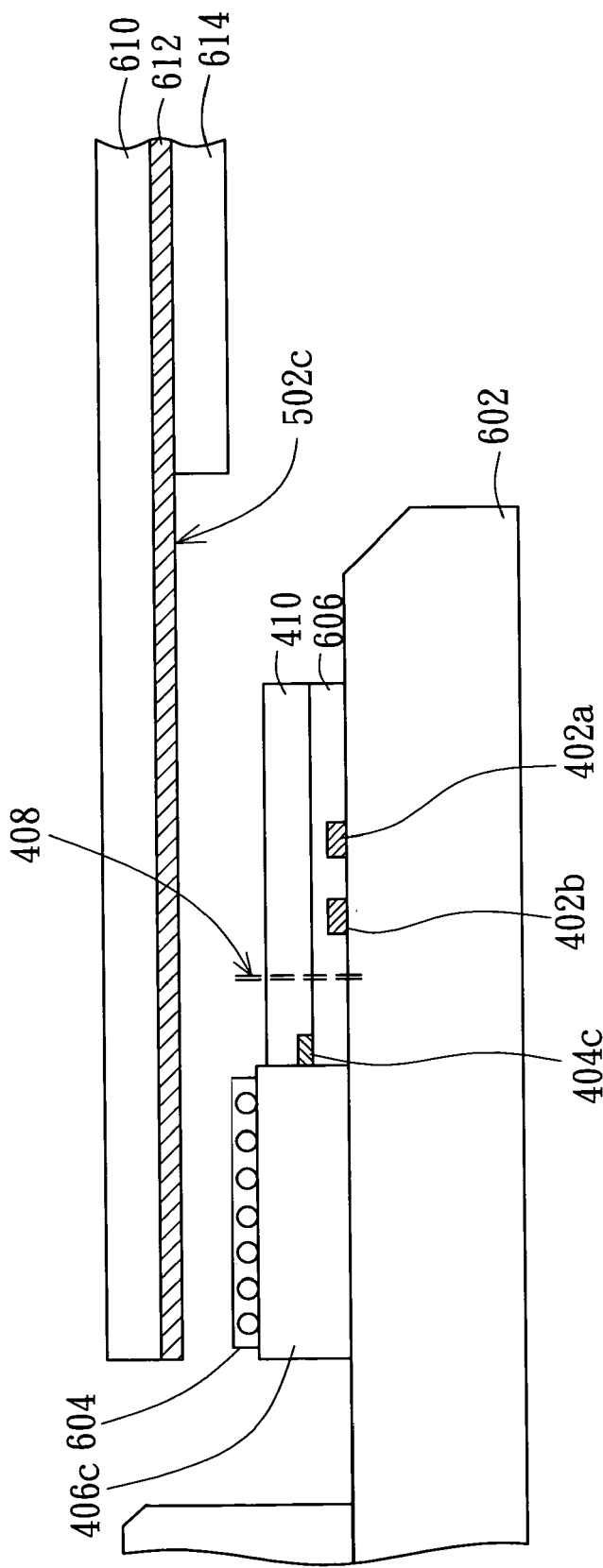
FIG. 6A is a sectional view along the sectional line 6A–6A' in FIG. 5.
Figure 6B:
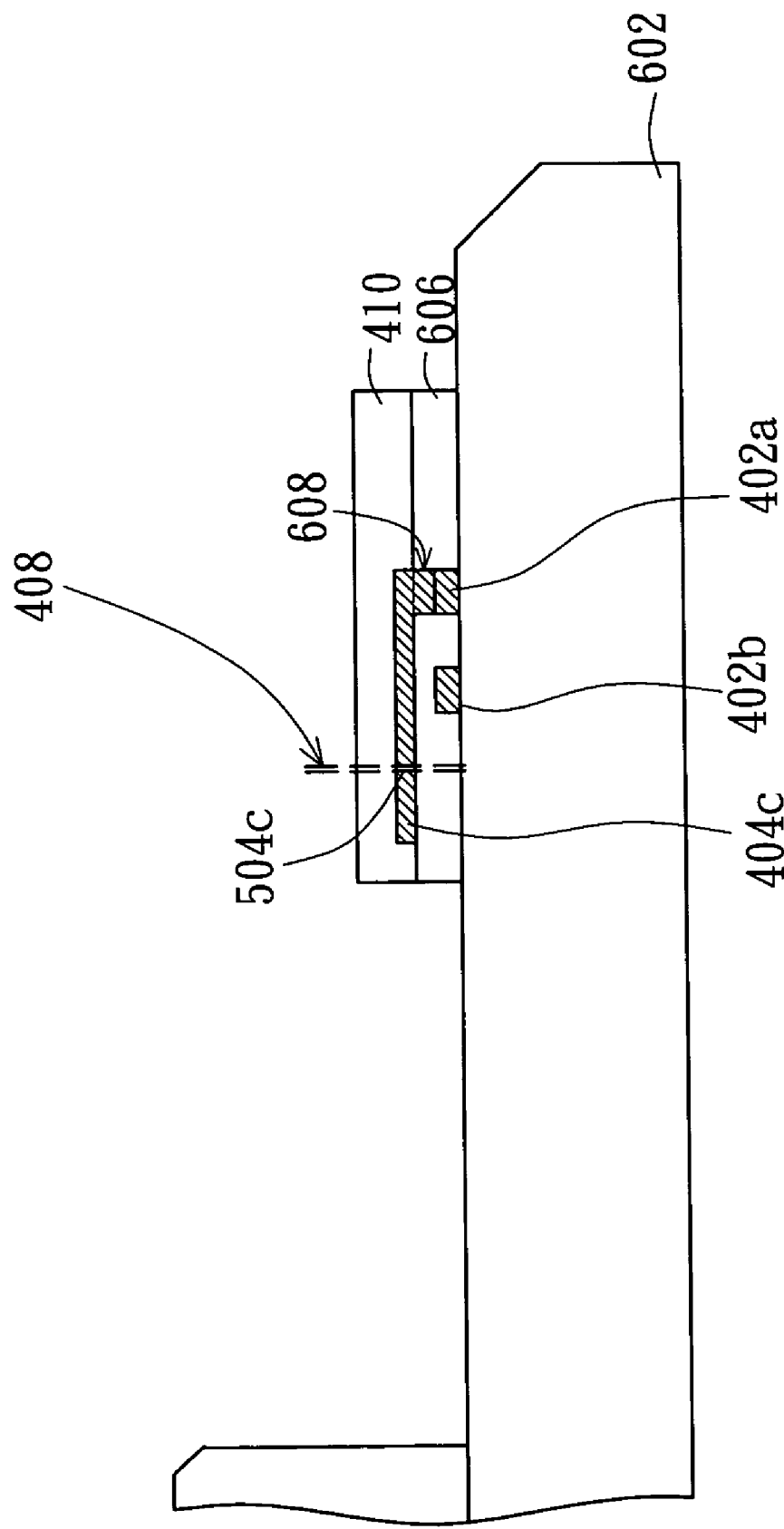
FIG. 6B is a sectional view along the sectional line 6B–6B' in FIG. 5.

Referring to FIG. 6A, a sectional view along sectional line 6A–6A' in FIG. 5, and FIG. 6B, a sectional view along sectional line 6B–6B' in FIG. 5. Two shorting bars 402a and 402b are deposited on substrate 602 in parallel and are further covered up by a first passivation layer 606 for isolating and protecting the test circuit. In one embodiment, the substrate 602 can be a glass substrate. The first passivation layer 606 has a number of via holes through which connecting lines 404 are electrically connected to their corresponding shorting bars 402a and 402b. For example, connecting line 404c is electrically connected to shorting bar 402a through via hole 608. The TCP has three layers, namely, polyimide (PI) layer 610, copper plating layer 612 and solder resist (SR) layer 614. Using ACF 604 as an adhesive and a conductive medium, a test signal can be transmitted to first leads 406c via copper plating layer 612.

Only second passivation layer 410 can be found at the intersection of the cutting trace 408 and the section line 6A–6A' in FIG. 6A; connecting line 404c does not pass through there. When second lead 502c is sealed downward during the hot sealing process, not any metal remnants can be found between second lead 502c and cutting trace 408. So, electrical short circuit will by no means occur between the second layer of second lead 502c, ie copper plating layer 612, and the metal remnants left at disconnecting point 504c.

Referring to FIG. 6B and FIG. 5 at the same time. Since the disconnecting point 504c along the section line 6B–6B' is situated between second leads 502c and 502d, the metal remnants at disconnecting point 504c will by no means contact with second leads 502c and 502d. Consequently, short circuit can be totally avoided therein.

The short-circuit protection for test circuit disclosed in the above preferred embodiment according to the invention has the advantage of avoiding the occurrence of short circuit between disconnecting points caused by laser cutting and the TCP leads during the sealing process of the leads.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display module comprising:
   a substrate;
   a plurality of first leads disposed over the periphery of the substrate;
   a plurality of shorting bars disposed over the substrate edge, which are adjacent to ends of the first leads;
   a plurality of second leads mounted with the corresponding first leads respectively, which are electrically connected to the corresponding first leads;
   a plurality of cutting traces for electrically disconnecting the first leads from the shorting bars; and
   a plurality of connecting lines for electrically connecting the shorting bars and the first leads, wherein the connecting lines have line segments disposed between the adjacent second leads to alternate therewith so that intersections of the cutting traces and the line segments are located between the adjacent second leads;
   wherein the connecting lines are cut off along the cutting trace after the liquid crystal display module has been tested, so that the shorting bars are completely electrically disconnected from the first leads, and a disconnecting point is formed on the intersection of the each cutting trace and connecting line.

2. The liquid crystal display module according to claim 1, wherein the first leads comprise a plurality of indium tin oxide (ITO) leads.

3. The liquid crystal display module according to claim 1, wherein the first leads comprise metal.

4. The liquid crystal display module according to claim 1, wherein the second leads comprise a plurality of tape carrier package (TCP) leads.

5. The liquid crystal display module according to claim 1, wherein the second leads comprise metal.

6. The liquid crystal display module according to claim 1, wherein the intersection of the each cutting trace and connecting line is situated to the right side of the corresponding second lead.

7. The liquid crystal display module according to claim 1, wherein the intersection of the each cutting trace and connecting line is situated to the left side of the corresponding second lead.

8. The liquid crystal display module according to claim 1, wherein the shorting bar is covered by a first passivation layer having one or more via holes, the connecting line is covered by a second passivation layer, and each of the connecting lines is electrically connected to the corresponding short bar through the corresponding via hole.

9. A liquid crystal display module comprising:
a substrate;
a plurality of first leads disposed over the periphery of the substrate;
a plurality of shorting bars disposed in a horizontal direction over the substrate edge, which are adjacent to ends of the first leads and electrically connected to a test unit for testing the liquid crystal display;
a first passivation layer for covering the shorting bars, wherein the first passivation layer has a plurality of via holes;
a plurality of second leads mounted with the corresponding first leads respectively, which are electrically connected to the corresponding first leads;
a plurality of connecting lines for electrically connecting the shorting bars and the first leads, wherein the connecting lines have line segments disposed between the adjacent second leads in a vertical direction to alternate therewith;
a second passivation layer for covering the connecting lines, wherein each of the connecting line is electrically connected to the corresponding short bar through the via hole; and
a plurality of cutting traces for electrically disconnecting the first leads from the shorting bars, wherein intersections of the cutting traces and the line segments are located between the adjacent second leads;
wherein the connecting lines and the second passivation layer are cut off along the cutting trace after the liquid crystal display module has been tested, so that the shorting bars are completely electrically disconnected from the first leads, and a disconnecting point is formed on the intersection of the each cutting trace and line segment.

10. The liquid crystal display module according to claim 9, wherein the first leads comprises a plurality of indium tin oxide (ITO) leads.

11. The liquid crystal display module according to claim 9, wherein the first leads comprise metal.

12. The liquid crystal display module according to claim 9, wherein the second leads comprise a plurality of tape carrier package (TCP) leads.

13. The liquid crystal display module according to claim 9, wherein the second leads comprise metal.

14. The liquid crystal display module according to claim 9, wherein the intersection of the each cutting trace and line segment is situated to the right side of the corresponding second lead.

15. The liquid crystal display module according to claim 9, wherein the intersection of the each cutting trace and line segment is situated to the left side of the corresponding second lead.

* * * * *